United States Patent [19]

Scruggs

[11] 3,919,629

[45] Nov. 11, 1975

[54] PROXIMITY SENSING DEVICE USING AN INDUCTANCE AND CAPACITANCE RESONANT BRIDGE NETWORK

[76] Inventor: Carol L. Scruggs, 52500 Southdawn, Utica, Mich. 48087

[22] Filed: Nov. 5, 1973

[21] Appl. No.: 412,742

[52] U.S. Cl. .......... 324/41; 331/65

[51] Int. Cl.[2] .......... G01R 33/12

[58] Field of Search .......... 324/34 PS, 34 D, 34 Q, 324/40, 41; 331/65; 328/5; 317/DIG. 2

[56] References Cited

UNITED STATES PATENTS

| | | | |
|---|---|---|---|
| 3,209,292 | 9/1965 | Montross | 324/41 |
| 3,483,437 | 12/1969 | Coyne | 331/65 |
| 3,521,085 | 7/1970 | Taylor | 324/41 |
| 3,745,379 | 7/1973 | Gross | 328/5 |

*Primary Examiner*—Robert J. Corcoran

[57] ABSTRACT

A transistor driven inductance and capacitance bridge network is adjusted for oscillation by increasing the inductance of the coil in the collector circuit of the transistor and driven into non-oscillation by the detection of a ferrous material in the proximity of the inductance placed in the emitter circuit of the transistor driver. The oscillations of the bridge network are detected by a switching transistor, a portion of its output being directed to a shaping network and a power switching network to turn off power to the load, and another portion of which is fed back to the driving transistor to sustain the oscillation until the ferrous material to be sensed is placed into proximity with the emitter inductance of the bridge. Ceasing the oscillation actuates the power switching network to apply power to the load. By using a silicone controlled rectifier in combination with a diode bridge in series with the load as the power switching network and an internal power supply, alternating current may be used without providing separate direct current power for the operation of the electronic circuitry.

3 Claims, 3 Drawing Figures

PROXIMITY SENSING DEVICE USING AN INDUCTANCE AND CAPACITANCE RESONANT BRIDGE NETWORK

BACKGROUND OF THE INVENTION

This invention relates generally to bridge operated proximity detectors and more specifically to a transistor driven inductance-capacitance bridge network proximity sensor.

1. Field of the Invention

Proximity detection systems are well known in the art. Many examples could be cited to illustrate when and where proximities sensing may be required. A few such examples might include parameter or boundary controls for restricted or dangerous areas or for burglary or security controls for homes or buildings. Proximity sensing may also be used as counters, sorters and measuring devices for product handling. Another example of a use for a proximity sensing means is to control machine tools for safety, as when a punch press is turned off if an operator puts his hands under the ram or for automatic operation to actuate the ram when the material to be formed is in position in the machine.

2. Description of the Prior Art

Prior art proximity sensing devices ranged from a mere switch which is activated by the presence of the device, such as a magnetic reed switch, to highly sophisticated devices including oscillators establishing a radio frequency field which is disturbed by the intruding object. The switches were inaccurate for precise detection and the radio frequency field caused noise in radio and other communication receivers. Controlling the area covered by the field was very difficult.

For more controlled operation of the proximity sensor, reactance bridge devices were developed. Prior art bridge devices were generally formed in inductance and resistance devices or required an external frequency generating device to operate, that is, unbalance the bridge. As a result, the prior art devices are of a necessity complex.

What is needed is a bridge proximity sensor which is self-contained, more sensitive to proximate actuating devices, and capable of high selectivity in proximity sensing, and which operates in series with a utilization means for direct connection to an alternating current.

SUMMARY OF THE INVENTION

The bridge proximity sensor according to the present invention comprises a transistor driven inductance and capacitance bridge network adjusted to generate an unbalanced or oscillation signal when "at rest", that is, not detecting a ferrous metal. The unbalance signal is amplified and a portion of the amplified signal is fed back to sustain the unbalance signal until the bridge is again balanced. The imbalanced signals are shaped to drive a switching transistor into conduction to actuate a utilization device required to be controlled by the proximity sensor.

The proximity sensor comprises a transistor driven inductance and capacitance bridge network having the bridge unbalanced into generating oscillation signals by adjusting the inductive reactance of the coils. The unbalanced state oscillation signal is amplified and provides a feedback signal to sustain the oscillation signals. The introduction of a ferrous material in proximity to the coil in series with the emitter of the transistor driver increases the inductance of the coil to cease the generation of oscillation signals. The oscillation signals are directed to a pulse shaping network, the output of which is directed to a power switching network comprising a silicone controlled rectifier, diode bridge combination. The power switching network controls an alternating current operated load utilization device. The diode bridge along with an internal power supply provide the direct current for operation of the proximity sensing device from an alternating current source.

It is, therefore, an object of the present invention to provide an enhanced proximity sensing device.

It is a more particular object of the present invention to provide an improved transistor driven bridge proximity device.

it is another object to provide an inductance and capacitance bridge proximity sensing device.

It is still another object to provide a self-contained alternating current operation proximity sensing device which senses ferrous metals without requiring physical contact with the actuating material.

It is yet another object to provide an improved bridge sensing device with feedback circuitry which is sensitive at its front face only without requiring external oscillation actuation.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be fully understood from the following description of an illustrated embodiment when read in conjunction with the accompanied drawing, wherein.

DESCRIPTION OF THE PREFERRED EMBODIMENT

Figure 1:
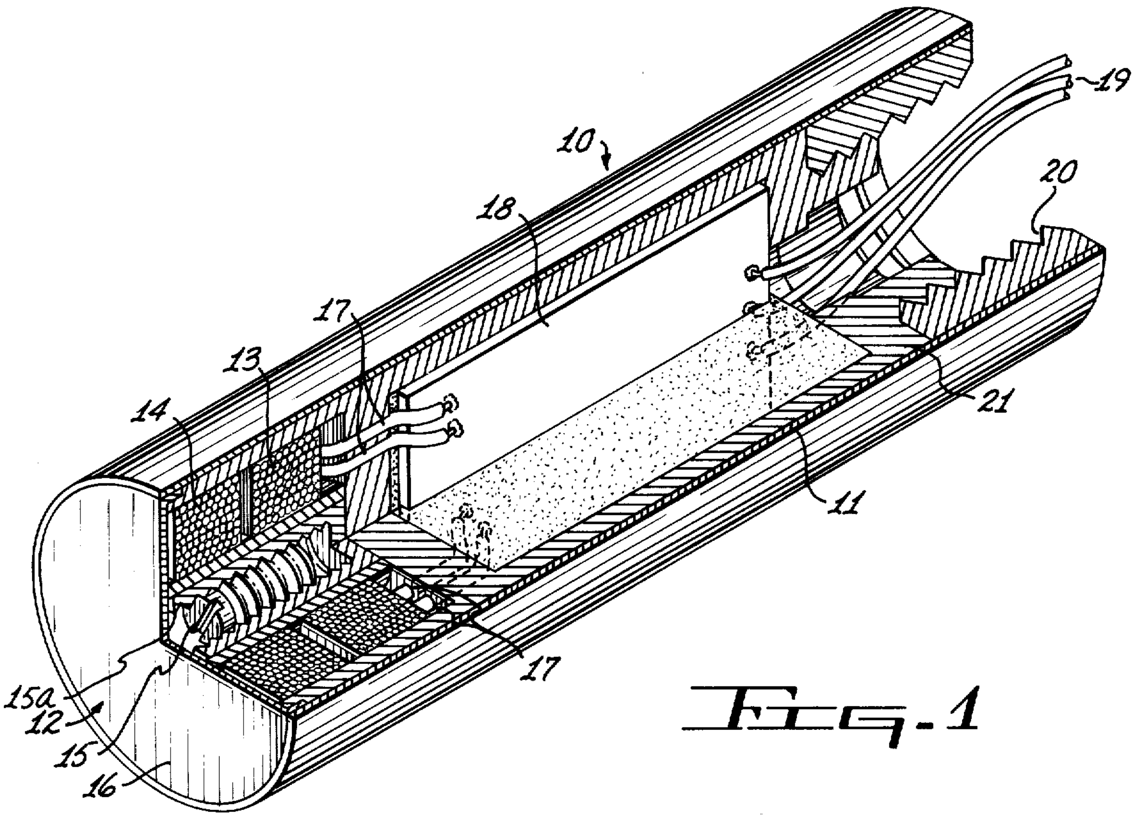
FIG. 1 is a cutaway perspective view of a bridge inductance-capacitance proximity sensor according to the present invention.

Referring now to the drawings, FIG. 1 discloses a proximity sensor 10 comprising a grounded housing shield 11 encapsulating the operational items that perform the sensing. The proximity sensor 10 according to the preferred embodiment of the present invention senses ferrous metals by proximity at its sensing face 12. Two coils 13 and 14 are placed adjacent to the sensing face 12 in close coupling with each other. A threaded ferrous insert 15a is pressed into the core of the coils 13 and 14 to balance the coils for exact impedance match. A ferrous set screw core 15 is then inserted within coils 13 and 14 adjacent to the coil 13 to increase its inductance relative to that of coil 14 to unbalance its impedance match with the coil 14. The grounded non-ferrous housing shield 11 such as aluminum protects the coils from unwanted stray signals. A non-ferrous cap 16 preferably of stainless steel covers the sensing face 12 of the proximity sensor 10 and does not affect the impedance of the coils.

Leads 17 from the coils 13 and 14 are directed to a printed circuit board 18 containing the electronic circuitry for operation of the proximity sensor 10 as will be discussed later in the discussion of FIGS. 2 and 3. Lead wires 19 from the printed circuit board 18 are directed from the proximity sensor for connection to the utilization device and to the alternating current source. Internal threads 20 are provided as a grounding source and for mounting the device. The interior of the housing can then be filled with a liquid which hardens on exposure to air such as epoxy 21 to prevent failure of the proximity sensor when mounted such that the device is subject to vibrations.

Figure 2:
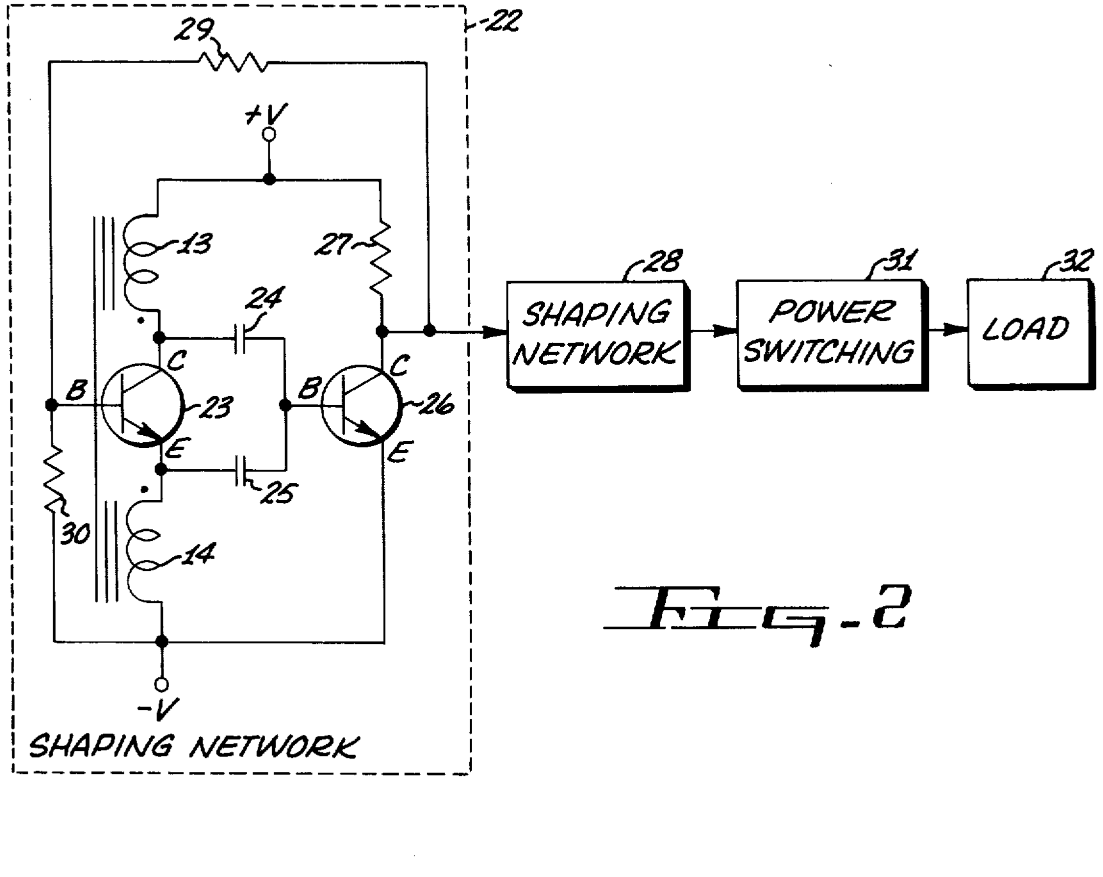
FIG. 2 is a schematic and block diagram of the proximity sensor shown in FIG. 1.

Referring now to FIG. 2, the circuitry internal to the proximity sensor 10 of FIG. 1 is shown comprising a sensing network 22 including the two coils 13 and 14 connected in series with a bridge transistor 23 in a bridge configuration with two capacitors 24 and 25. The two capacitors 24 and 25 have identical capacitance. The coils 13 and 14 are connected in series between a plus and minus voltage potentials with the collector C and emitter E terminals of the bridge driving transistor 23, respectively.

The bridge network especially the emiter coil 14 detects the presence of the ferrous material placed in proximity to the sensing face 12 of the proximity sensor 10. In an at rest state with no ferrous material being sensed, the bridge network is in an unbalanced state generating imbalance signals since the collector coil 13 has a larger inductance because of the set screw 15 placed in the center emitter the coil 13. The imbalance signals from the bridge network are transmitted to the base B of a grounded emitter transistor amplifier 26. The collector of the amplifier transistor 26 is connected to the positive voltage potential +V via a collector resistor 27. The collector is also connected to a shaping network 28 and to a feedback resistor 29 which directs a portion of the amplified imbalance signal caused by the unbalanced bridge network back to the base B of the bridge transistor 23 to develop and sustain oscillation signals.

The sensing network 22 of FIG. 2 shows the schematic configuration of the close coupling between the two inductances, the coils 13 and 14. Both transistors 23 and 26 are of the NPN type. The capacitors 24 and 25 are of identical capacitance and thus when the inductance of the coil 13 is increased by adjusting set screw 15, oscillation signals are generated by the bridge transistor 23 together with the collector coil 13, the capacitor 24, the transistor 26 and the feedback resistor 29. The feedback resistor 29 and a base resistor 30 form a voltage dividing network for operating the bridge transistor 23. The in-phase signals fed back by the feedback resistor 29 cause the bridge transistor 23 to continue the oscillation of the bridge network. The oscillation will continue until a ferrous material is placed in proximity to the sensing face 12 of the proximity sensor 10 at which time the bridge is driven into a non-oscillating state by the coil 14 and capacitor 25 ringing network.

The amplified oscillating signals from the sensing network 22 are shaped in a shaping network 28 and inactivate or turn off a power switching network 31. The power switching network 31 when activated operates a utilization device shown as a load 32.

Bringing a ferrous material close to the sensing face 12 of the proximity sensor 10, see FIG. 1, causes the inductance of the front or emitter coil 14 to increase. Increasing the inductance of the emitter coil 14 causes a balanced state to be reached with the collector coil 13. This balance, referring to FIG. 2, causes the bridge network of the sensing network 22 to become balanced and to cease generating oscillation signals. Ceasing the oscillation signals causes the shaping network 28 to activate the power switching network 31 and thereby activate the load 32.

Figure 3:
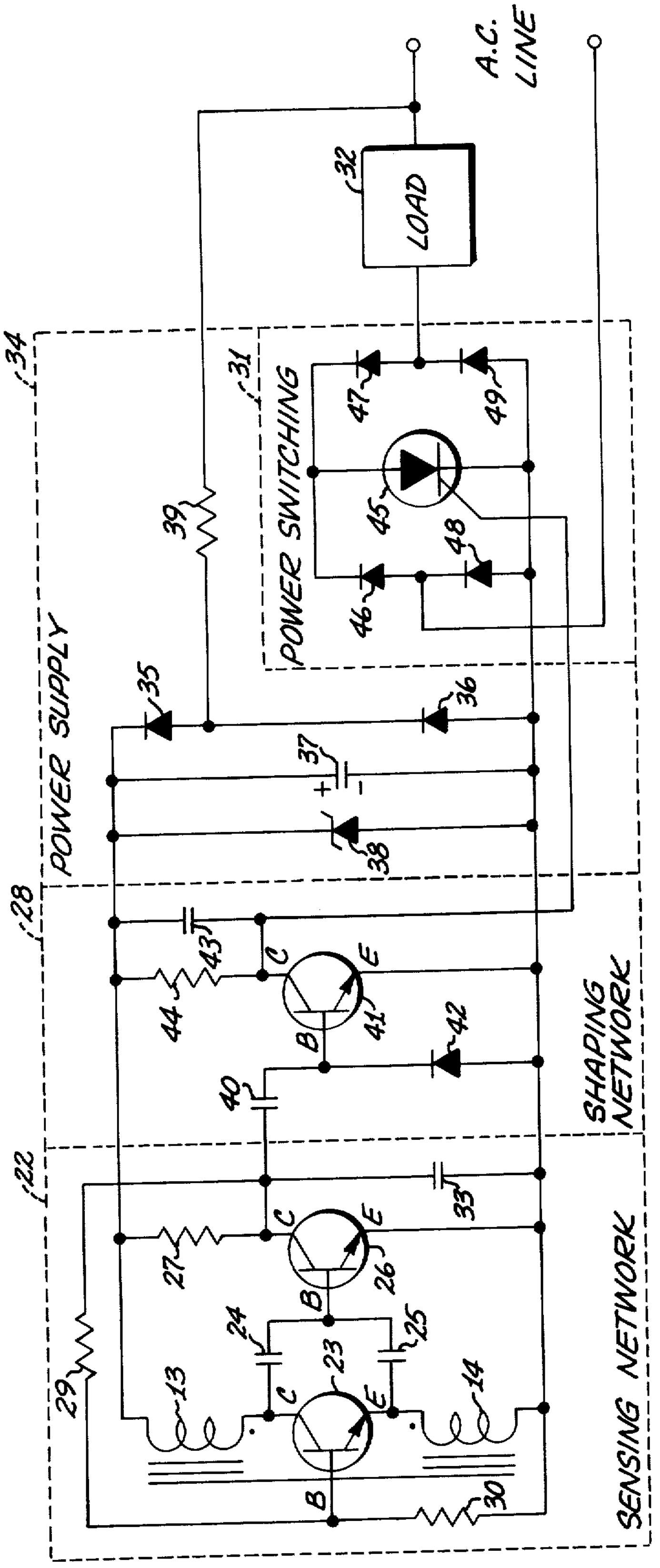
FIG. 3 is a circuit diagram of a self-contained proximity sensing device operating in series with a load utilization device from an alternating current source.

The entire circuitry involved in the proximity sensor 10 is shown in FIG. 3. The sensing network 22 of FIG. 3 is identical to the sensing network of FIG. 2 except for a capacitor 33 connected to the collector C of the amplifying transistor 26. This capacitor will affectively ground any high frequency parasitic signals caused by the harmonic frequency oscillations of the bridge network.

Still referring to FIG. 3, the direct current power for operating the proximity sensor 10 is obtained from a power supply 34 contained within the housing 11 and comprising a diode 35, a limiting resistor 39, and an electrolytic capacitor 37 for providing the direct current. A zener diode 38 is included for limiting the direct current voltage supplied by the power supply in conjunction with the limiting resistor 39 connecting to one side of the alternating current power source, the AC line. The power supply 34 operates in conjunction with the power switching circuitry 31, diode 48, to obtain the half wave diode bridge source for the power supply capacitor 37. The direct current potentials, both positive and negative, are then applied to the sensing network 22 and the shaping network 28 as shown in FIG. 3.

Continuing with the discussion of the proximity sensor circuitry of FIG. 3, the output of the sensing network 22 is taken from the collector C of the amplifying transistor 26 and directed via a capacitor 40 to a grounded emitter switching transistor 41 in the shaping network. A diode 42 connected between the base B of the transistor 41 and the minus potential provides the operating characteristics for the transistor 41. The oscillations from the sensing network 22 are amplified and shaped to become a direct current operating voltage by the transistor 41 in combination with a capacitor 43 and resistor 44 connected between the collector C of the transistor 41 and the positive voltage supply. The collector C of the transistor 41 of the shaping network 28 is then connected to control the gate of a silicone controlled rectifier 45 (SCR) of the power switching section 31.

The power switching section 31 comprises the SCR 45 having its anode and cathode connected between the common cathode and common anode portions, respectively, of a diode bridge network, comprising four diodes 46, 47, 48 and 49. The other connections of the diode bridge are connected in series with the load 37 to the alternating current line. Activating the gate of the SCR 45 causes the SCR to conduct and via the bridge diode network to cause current to flow through the load 32 and thus activate the utilization device.

In the operation of the proximity sensor according to the preferred embodiment, the threaded ferrous insert 15*a* is adjusted to balance the coils 13 and 14 for an approximate impedance match. The ferrous set screw 15 is then inserted within coils 13 and 14 but closer to coil 13 to increase its inductance relative to coil 14 to cause an imbalance in the bridge network. The collector coil 13 and capacitor 24 form a ringing network with the bridge transistor 23. The imbalance signal is amplified by the amplifier transistor 26 and a portion of the amplified imbalance signal is fed back to the base B of the bridge transistor 23 to instigate and sustain oscillations. These oscillating signals are amplified by the amplifying transistor 26 and directed via the capacitor 40 to the transistor 41 of the shaping network 28. The oscillating signals activate the transistor 41 causing the transistor 41 to conduct bringing the potential of its collector C and the gate of the SCR 45 to approximately a ground potential. The ground potential on its gate prevents the SCR from conducting and thus does not provide a path for the AC line voltage through the load 32.

When the ferrous material that is to be sensed is brought into proximity to the sensing face 12 of the proximity sensor 10, the inductance of coil 14 is increased until its effect is to match the imbalance signal caused by the coil 14 and the capacitor 25 to that caused by the coil 13 and the capacitor 24. Increasing the inductance of the coil 14 causes an out-of-phase signal to be amplified by the transistor 26 and to be fed back via resistor 29 to the base B of the transistor 28 thereby further preventing oscillation of the bridge network. Bringing the ferrous material to be sensed immediate to the face 12 of the proximity sensor 10 effectively drives the sensing network 22 further from an oscillation state.

Shutting off the oscillations of the sensing network 22 causes the transistor 41 of the shaping network 28 to cease conduction. A positive potential will appear on the gate terminal of the SCR 45 via the resistor 44 causing the SCR 45 to conduct. The SCR 45 via the bridge circuit diodes 46, 47, 48 and 49 conducts the alternating current for actuation of the load utilization device 32.

The principles of the present invention have now been made clear in an illustrated embodiment. There will be immediately obvious to those skilled in the art many modifications of structure, arrangement, proportions, the elements, materials and components used in the practice of the invention. For instance, NPN type transistors are used in the control of the sensing network 22 and the shaping network 28. It is obvious to one skilled in the art that PNP transistors could likewise be used by reversing the potential of the power supply 34. Likewise a TRIAC alternating current switching device could be used in place of the diode bridge SCR device shown in the power switching section 31. The appended claims are, therefore, intended to cover and embrace any such modifications, within the limits only of the true spirit and scope of the invention.

What I claim is:

1. A proximity sensor apparatus for sensing metallic materials comprising:

a bridge sensing network including a first transistor including base, emitter and collector terminals, a first coil and a first capacitor connected at first ends thereof to the emitter of said first transistor, a second coil and a second capacitor having a capacitance value equal to that of said first capacitor connected at first ends thereof to the collector of said transistor, the second end of said first coil connected to a first potential source voltage and the second end of said second coil connected to a second potential source voltage, the second end of said first and second capacitor connected together and to a base terminal of a second transistor including an emitter and collector terminals, said second transistor being biased to amplify output signals from said first transistor, a feedback means connected between the collector of said second transistor and the base of said first transistor;

a threaded ferrous insert placed as a common core to both said first and second coils and adjusted such that the inductance of said first coil equals the inductance of said second coil;

a ferrous set screw having threads matching said threaded ferrous insert, said set screw adjusted within said treaded ferrous insert to increase the inductance of said second coil, said second coil and said second capacitor generating imbalance signals thereby to cause said second coil and said second capacitor to generate imbalance signals and with said second transistor and said feedback means to generate oscillation signals; and a switching network connected to receive said oscillation signals and actuably thereby to inactivate a utilization means;

wherein when the ferrous material to be sensed is brought adjacent said first coil, said first coil and said first capacitance generate balancing-opposing signals to said imbalance signals to stop the generation of oscillation signals and thereby actuate said switching network to activate the utilization means.

2. A proximity sensor apparatus as described in claim 1 wherein said switching network includes:

a switching transistor connected to receive said oscillation signal, said switching transistor being in conduction with the presence of said oscillation signals on its base terminal and out of conduction when said oscillation signals cease; and a power switching circuit connected in series with a power source and the utilization means, said power switching circuit actuably by said switching transistor to present an open circuit to said power source when oscillation signals are received thereby and to present a closed circuit when oscillation signals cease.

3. A proximity sensor apparatus as described in claim 2 wherein said power switching circuit includes:

a silicon controlled rectifier having its gate actuable by said switching transistor; and a diode bridge network having its common cathode terminal connected to the anode of said silicon controlled rectifier and its common anode terminal connected to the cathode of said silicon controlled rectifier and having its other two terminals connected to a series connection of the utilization means and the power source, said power source being an alternating current source.

* * * * *